Patented Apr. 2, 1940

2,195,586

UNITED STATES PATENT OFFICE 2,195,586

ACID AND WATER PROOF CEMENT

Foster Dee Snell, New York, N. Y.

No Drawing. Application February 29, 1936,
Serial No. 66,500

7 Claims. (Cl. 106—30)

The object of my invention is an acid proof and water proof silicate cement which shall have utility as a mortar in masonry construction, be of special value in cementing tiles or linings in tanks designed for containing acids or water, which can be applied to inside walls as plaster or to outside walls as stucco, can be cast into architectural forms and objects of art, and may be used for many other useful purposes.

A principal object of my invention is that the cement produced shall be completely neutralized, and that this neutrality shall be inherent in the composition and not imposed upon it by the addition of acid substances, after it has become hardened.

It is also an object of my invention to produce a cement of the kind described for which the time of setting shall be controllable by a modification of the relative amounts of the substances composing it.

The invention accordingly comprises a composition of matter, possessing the characteristics, properties, and the relation of constituents which will be exemplified in the composition hereinafter described and the scope of the invention will be set forth in the claims.

In my Patent Number 1,973,732, dated September 18, 1935, silicate cements comprising solid sodium silicate, sodium silicofluoride, and a filler are disclosed and claimed. These are both acid and water proof.

Further investigation of the compound described and claimed in that patent has shown a method of obtaining an improved result using liquid sodium silicate, that is, a preformed aqueous solution of the said silicate. Prior attempts to use liquid sodium silicate with aggregate and various setting agents have been only limitedly successful. If the amount of setting agent, of which I will discuss sodium silicofluoride as a typical example, was sufficient, so that the usual commercial silicates were completely neutralized, the working time was too short for commercial use. If on the other hand an amount of silicofluoride was used such that an adequate working time was allowed, the cement was not completely neutralized. This has been recognized in the use of cements containing 2-4 per cent of sodium silicofluoride in the powder to be mixed with liquid sodium silicate, which does not give a completely neutralized cement with the silicates commonly used.

I have discovered that if a more alkaline liquid silicate is used than that commonly used in the acid proof cement industry a much greater amount of sodium silicofluoride can be used, an amount such that complete neutralization is finally obtained and yet a working period of 15-30 minutes, varying with the temperature, is allowed before the cement sets to a point such that it cannot be satisfactorily manipulated or worked. Complete neutralization is usually judged by reaction to phenolphthalein. Many special devices such as addition of lead glass, litharge, etc., have been used to obtain water proof properties in the absence of a known method for completely neutralizing the liquid sodium silicate.

The sodium silicate preferably used in the process of my earlier patent is a commercial product known in the New York market as "GC silicate" in which the ratio of sodium oxide to silicon dioxide is 1 to 2.

Both solid and liquid silicates of sodium are commercially available in which that ratio varies. This is expressed by saying that they have different alkalinities. All solutions of waterglass have an alkaline reaction, but I have selected the water-glass of 1:3.25, and higher soda-silica ratio for my process and designated them as relatively highly alkaline.

Silicate cements must be void of alkalinity in order to be both acid and water proof.

My present discovery is therefore of a method whereby a liquid sodium silicate of a ratio approximately 1:3.25 or higher may be used. This form of expression of the ratio of $Na_2O:SiO_2$ is commonly used in industry and is a convenient expression of the degree of alkalinity of silicates. Commercial liquid sodium silicates vary from roughly 1:1.5 to 1:4, the most silicious, or least alkaline being those commonly used in making acid proof silicate cements. Undoubtedly somewhat more alkaline silicates could be used. Somewhat less alkaline silicates can be used with difficulty with the limitation that the common commercial 1:3.86 ratio cannot be used in my composition under ordinary working conditions. This new composition gives important advantages over the material used in my earlier patent in better adhesion to the surface to which the cement is applied and lower cost. The advantage of my invention is, further, that it sets completely throughout the cement without evaporation. For example, if the cement made according to my invention be mixed and sealed in an air-tight container, it will harden throughout altho evaporation of water is prevented. It is in effect an hydraulic form of acid proof cement formed by neutralization, the first workable one of this kind which has been developed with the use of liquid sodium silicate. The advantage of this will be brought out in the course of this application. A product depending on reaction of sodium silicate with elementary silicon has the disadvantages that the sodium ion present cannot be neutralized, the cement is porous and hydrogen evolved constitutes a hazard.

Adopting the formula $NaHSiO_3$ as the formula for the silicate used in my said patent, we have the following equation for the reaction between the sodium silicate and the sodium silicofluorid:

$$4NaHSiO_3 + Na_2SiF_6 + 3H_2O = 6NaF + 5H_2SiO_3$$

From this we see that for each four molecules of the silicate used in the cement mixture it will be necessary to use one molecule of sodium silicofluorid to neutralize the alkali ingredient of the silicate.

In my present invention this would also be the reaction but an important distinction must be made between the two cements. In that of my earlier patent both solid sodium silicate and solid sodium silicofluoride must dissolve in the water used for mixing. The two then meet in solution and react chemically to give the silicic acid formed as the bonding agent. In the process which is the subject of the present invention the sodium silicate is already in liquid form, the silicofluoride in solid form. The latter must dissolve and react with the silicate already in solution. To cause it to do so does not require such attention to detail in mixing as in the process of my earlier patent. It is my theory that the surface being cemented according to my earlier patent may be only wetted with water containing a dispersion of silicic acid and the drying of that acid on the surface is the method of bonding to the surface of the article cemented. Alternatively, it may be wetted by a low concentration of sodium silicate in water. In contradistinction to that my theory is that the present cement wets the surface being bonded with a concentrated solution of sodium silicate which is as yet only incompletely neutralized and subsequently the neutralization is completed. The good wetting power and penetrating power of sodium silicate solutions is well known and well recognized. The lack of as good wetting power from silicic acid dispersions is not so well recognized but is known.

In the optimum example given in my prior patent I disclose the use of 25 grams of the said sodium silicate and 23 grams of sodium silico fluoride. The sodium silico fluoride is then 15.5% of the total mixture.

According to the above equation, the amount necessary for exact neutralization of the 25 grams of sodium silicate having the action of 1 part of sodium oxide to two parts of silica, is only 11.6 grams or, had only that amount been used, 8.4% of the total preparation. In other words, in that example, almost twice as much silicofluorid is used as is necessary for complete neutralization of the silicate.

In the optimum of my second example in that patent, I disclose the use of 19 pounds of sodium silico fluorid and five pounds of sodium acid fluorid to neutralize 25 pounds of the same sodium silicate.

$$NaHSiO_3 + NaHF_2 = 2NaF + H_2SiO_3$$

is the equation which expresses the reaction between the sodium acid fluorid and the sodium silicate, and from this equation it is evident that the five pounds of the acid fluorid will neutralize 8.08 pounds of sodium silicate, leaving 16.92 pounds to be neutralized by the sodium silicofluorid.

Since, according to the preceding equation, this requires only 7.95 pounds while 19 pounds were used, an excess of silico-fluorid has been used here also.

Such use of excess of sodium silicofluoride beyond the theoretical amount is also required for the subject of this invention. The excess required is not the same however, but is unpredictable and determinable only by experimentation with different sodium silicates used.

Now I have found that an amount of sodium fluosilicate which will neutralize, say only 50% of the sodium silicate of a ratio 1:3.86 gives a cement which will harden satisfactorily, although leaving much to be desired in the time allotted for working before it sets, its "working time." Its final hardening, however, is not entirely because of the neutralization of the silicate by the silicofluorid but the carbon dioxide of the air, and escape of water from the cement also play a prominent part therein. It is slow in acquiring a permanent hardness. To acquire acid proof properties it is necessary to paint such a cement with acid, such as sulfuric acid, and then only the surface is acid proof, the center of the cement joint between bricks or other places not readily accessible to acid remains unneutralized.

The recommended procedure in making up acid proof cement mixtures is to use the concentrated commercial silicates to obtain the maximum possible strength.

Thus if a commercial silicate is used of such composition that 4 per cent of sodium silicofluoride in the cement mixture will completely neutralize it, the setting time is too short. If a silicate is selected such that a proper setting time will be allowed, the resulting cement is alkaline and not water proof without painting with acid. If, however, I select a commercial sodium silicate such as that as shown by experimentation 8–10 per cent of silicofluoride in the cement mixture will neutralize it, then the setting time is suitable for commercial use when mixed of a proper consistency.

This is an unpredictable and surprising result, and contrary to all experience in the manufacture of silicate cements. It is contrary to what would be predicted from the usual applications of industrial chemistry and depends on some factors which I do not understand and which so far as I know have not been interpreted in chemical or industrial literature. There are complex colloidal properties of liquid sodium silicates which are not well defined or well known and the difference in behavior of liquid sodium silicates with sodium silicofluoride may reside therein.

While I have spoken above entirely of the sodium silicate and silicofluoride, those of the other fixed alkali metals will serve equally well. The only obstacle to their use as a substitute is the question of cost. They are full equivalents.

The essence of my invention and that for which I desire patent protection is the use of a relatively high alkaline fixed alkali metal silicate such as 1:3.25 or higher and larger amounts of fixed alkali metal silicofluorids than have hitherto been used in the manufacture of silicate cements.

As an illustration of my invention I have obtained the result described with a dry mixture of 174 grams of sand and 22 grams of sodium silicofluoride, then mixed with 70 grams of liquid sodium silicate containing about 30 per cent of actual sodium silicate, the balance being water. The sodium silicate had a ratio of 1:2, corresponding therefore to the formula NaHSiO₃.

As another illustration, 100 grams of ground stoneware and 9.4 grams of sodium silicofluoride were mixed with 70 grams of commercial sodium silicate containing 38 per cent of actual sodium silicate and having a ratio of 1:3.25. This also gave complete neutralization. The cement takes an initial set in about 15–20 minutes under normal working conditions which is about the border line for commercial use. Similar results have not been obtainable with the nonalkaline silicates such as those having a ratio of the order of 1:3.75–1.4, which are commonly used in production of acid proof cement. Within the limits of the more alkaline silicates discussed in this application, the amount of sodium silicofluoride required must be determined by experiment, but the above illustrative examples are typical.

The amount of excess silicofluoride required also varies, according to my experiments, with the degree of alkalinity of the sodium silicate, being less with silicates of ratios such as 1:3.25 than with ratios of 1:2, but in all cases higher in actual silicofluoride than the commercial products available on the market and giving a result differing in kind rather than degree from such commercial products.

With these mixtures, or, in fact, with any mixture, the time of setting may be hastened by replacing a portion of the silicofluoride by sodium acid fluoride, whose reaction is much more vigorous than that of the silicofluoride. The shortening of setting time is closely in proportion to the amount of acid fluorid used.

Wherever in this specification and in the claims the terms "sodium silicate," "sodium silicofluoride," and "sodium acid fluoride" are used the full equivalence of all the compounds of the fixed alkali metals is to be involved in construing them.

It is also to be understood that the following claims are intended to cover all of the generic and specific features of the invention here described and all statements of the scope of the invention which as a matter of language, might be said to fall therebetween.

I claim:

1. The completely neutral silicate cement which comprises the reaction products of 9.4 parts of solid sodium silicofluoride and 70 parts of liquid 38% sodium silicate of the ratio Na₂O:SiO₂—1:3.25 and a suitable amount of aggregate.

2. The process of preparing a silicate cement which comprises mixing solid sodium silicofluoride with a preformed aqueous solution of a fixed alkali metal silicate of concentration approximately thirty to thirty-eight per cent silicate containing at least one molecular proportion of alkali metal oxide for 3.25 molecular proportions of silicon dioxide, the silicofluoride being used in proportion up to 50 per cent in excess of the amount required theoretically to neutralize completely the said silicate.

3. The process of preparing a silicate cement which comprises mixing an aggregate and solid sodium silicofluoride with a preformed aqueous solution of a fixed alkali metal silicate of concentration approximately thirty to thirty-eight per cent silicate containing at least 1 molecular proportion of alkali metal oxide for 3.25 molecular proportions of silicon dioxide, the silicofluoride being used in excess of the amount required theoretically to neutralize completely the said silicate.

4. The process of preparing a silicate cement which comprises mixing solid sodium silicofluoride with a preformed aqueous solution of a fixed alkali metal silicate of concentration approximately thirty to thirty-eight per cent silicate containing 1 molecular proportion of alkali metal oxide for 2 to 3.25 molecular proportions of silicon dioxide, the silicofluoride being used in excess of the amount required to neutralize completely the said silicate.

5. The process described in claim 2, a portion of the silicofluoride being substituted by an equivalent amount of solid sodium acid fluoride.

6. A silicate cement comprising a preformed aqueous solution of sodium silicate of concentration approximately thirty to thirty-eight per cent and admixed solid sodium silicofluoride, the silicate containing at least 1 molecular proportion of sodium oxide to 3.25 molecular proportions of silicon dioxide and the silicofluoride being present in at least the amount adequate theoretically to neutralize the silicate.

7. The process of manufacturing a silicate cement which comprises mixing together a 38 per cent solution of a sodium silicate, having a ratio between the sodium oxide and silicon dioxide of between 1:3.25 and 1:2, sufficient solid sodium silicofluoride to neutralize completely the said silicate, and a further amount of sodium silicofluoride which will shorten the time before the mixture takes a set.

FOSTER DEE SNELL.